United States Patent [19]

Chu

[11] Patent Number: 5,288,413
[45] Date of Patent: Feb. 22, 1994

[54] TREATMENT OF A WASTE SLUDGE TO PRODUCE A NON-STICKING FUEL

[75] Inventor: Humbert H. Chu, Houston, Tex.

[73] Assignee: Shell Oil Company, Houston, Tex.

[21] Appl. No.: 887,720

[22] Filed: May 22, 1992

Related U.S. Application Data

[63] Continuation-in-part of Ser. No. 782,185, Oct. 24, 1991, abandoned.

[51] Int. Cl.$^5$ ............................................. C02F 1/02
[52] U.S. Cl. ..................... 210/770; 106/745; 208/13; 210/774; 210/777
[58] Field of Search .............. 106/745, 739; 110/346; 208/13; 210/770, 774, 808, 777, 769, 806

[56] References Cited

U.S. PATENT DOCUMENTS

| | | | |
|---|---|---|---|
| 4,179,263 | 12/1979 | Jung et al. | 106/745 |
| 4,260,489 | 4/1981 | Greig et al. | 210/771 |
| 4,417,976 | 11/1983 | Sander et al. | 208/188 |
| 4,510,061 | 4/1985 | White | 210/769 |
| 4,775,457 | 10/1988 | Beer et al. | 208/13 |
| 4,874,505 | 10/1989 | Bartilucci et al. | 208/131 |
| 4,985,131 | 1/1991 | Lane | 208/13 |
| 5,009,767 | 4/1991 | Bartilucci et al. | 208/85 |
| 5,078,593 | 1/1992 | Schreiber et al. | 110/346 |
| 5,141,526 | 8/1992 | Chu | 210/777 |

FOREIGN PATENT DOCUMENTS

| | | |
|---|---|---|
| 146062A | 12/1983 | European Pat. Off. |
| 257059A | 1/1987 | Fed. Rep. of Germany |
| 63-120792A | 11/1986 | Japan |
| 63-221843A | 3/1987 | Japan |

Primary Examiner—Joseph W. Drodge

[57] ABSTRACT

A waste sludge that contains water, oil and solids is subjected to filtration under vacuum or an applied inert gas pressure, preferably no more than 50 psia while utilizing a filter aid, to retain the maximum amount of oil in the filter cake. The filter cake is then dried at a relatively low temperature, slightly above the boiling point of water, to selectively remove water and produce a high heating value non-sticking solid. The product thus obtained in suitable for use as a solid fuel for a cement kiln or other combustion facilities. Depending on the amount of oil present in the original sludge, the applied pressure can be varied to retain different amounts of oil and to produce different heating values desired in the final solid fuel.

11 Claims, No Drawings

TREATMENT OF A WASTE SLUDGE TO PRODUCE A NON-STICKING FUEL

CROSS-REFERENCE TO RELATED APPLICATION

This is a continuation-in-part of Ser. No. 07/782,185, filed Oct. 24, 1991, now abandoned.

BACKGROUND OF THE INVENTION

1. Field of the Invention

The present invention relates to the preparation of a fuel from a waste sludge that contains water, solids and oil by means of filtration and drying. It relates in particular to the use of the dried filter cake obtained by such method as fuel in a cement kiln, or other combustors.

2. Description of the Related Art

Waste streams are a growing concern to the environment. Authorities impose increasingly stringent requirements as to the disposal of waste streams. In refineries, waste sludges are obtained as a waste stream during the work-up of crude oil fractions. Such sludges may include water, salt, catalyst wastes, dirt-like sand, and heavy oil. Sludges like these are not allowed to be disposed of without pre-treatment.

A suitable pre-treatment comprises a filtration to separate the solids from the liquids so that the solids can be disposed of and the filtrate can be worked up. One of the problems that arises in connection with disposal of the resulting filter cake relates to the leachability of metal ions therefrom. One way to solve the leachability problems resides in the fixation of the metal ions in cement. The waste may be mixed with cement and the admixture is allowed to set and a solid hard material is obtained which passes the leachability requirements set by the authorities. Another way to solve the problem of the metal ions is to incorporate the metal ions into the cement. Hence, it has been proposed to use solid material resulting from the filtration of waste as fuel in cement kilns so that the hydrocarbons can be burned and the metal ions contained in such material would be retained in the cement produced in the kiln. Cement producers, however, set certain requirements as to the quality of the material to be used as fuel. One such requirement is that the heating value of the material is at least 5,000 Btu/lb (about 11.6 kj/g). A higher heating value would be even more beneficial to the operation of the cement kiln since it will take 3-6 MM Btu energy to produce one ton of cement Another requirement is that the moisture content in the material should not exceed 10% wt, based on the total material. A third requirement is that the material is non-sticking to enable pneumatic transportation.

In a known treatment of refinery waste sludges the sludge is usually filtered at considerably high pressure, such as up to 200 psia, (about 13.7 bara) or subjected to severe centrifuging, thereby squeezing all fluids from the solids thus separated. The solids obtained are then dried at temperatures up to about 450° F. (about 232° C.). The remainder is a non-sticking solid material containing only a small portion of the oil present in the waste sludge. The material generally has a heating value of between 500-4,000 Btu/lb, which will not be sufficient to be used as solid fuel for a cement kiln or other combustors.

Bartilucci (U.S. Pat. No. 5,009,767) discloses a method in which oily sludges and other refinery waste streams are recycled, by segregating refinery or other sludges, to produce a high oil content waste, which is injected into a delayed coking unit, during the coking phase of the cycle and a high water content waste which is injected during the quenching phase of the delayed coking cycle. The high oil content waste is preferably subjected to a filtering operation prior to injection into the coker drum in order to remove water as well as components which increase the ash content of the final coke. However, Bartilucci fails to produce a high Btu, nonsticking solid fuel.

Greig (U.S Pat. No. 4,260,489) discloses a process for the treatment of oily sludge by filtering it through a precoated surface filter, treating the filtration residue with a hydrocarbon solvent and/or steam stripping the extracted residue. The residual oil content of the treated sludge is very low and it can be used for land fill operations.

An advantage of the present invention's process over the prior art's process is that the present invention's process reduces the moisture in a waste sludge to about 10% wt or less, while maintaining the maximum amount of oil in the waste sludge. This waste sludge has a high heating value which will be sufficient to permit use as a solid fuel for a cement kiln or other combustors.

SUMMARY OF THE INVENTION

The present invention therefore relates to a process for the preparation of a solid fuel from an oily waste sludge containing water, solids and oil. The process comprises filtering the sludge under vacuum or under applied pressure of inert gas to retain maximum amount of oil in the filter cake and selectively removing moisture from the filter cake by drying at a temperature only slightly above the boiling point of water at the pressure applied to the filter cake, thereby producing a high heating value, non-sticking solid fuel.

DETAILED DESCRIPTION OF THE INVENTION

The waste sludge which is treated in the process of the invention can incorporate water, solids and oil containing waste sludge. The sludge is suitably a waste stream of an oil refinery. Such sludges contain catalyst fines from refinery operations. These fines may contain metal compounds which were deposited thereon for purposes of catalysis. The sludge may further comprise salt and water which may result from the transportation of crude oil. The waste sludges also contain water and residual oily fractions from refinery operations. Typical waste sludges comprise from about 5 to about 80% wt of oil, from about 2 to about 80% wt of solids and from 2 to 90% wt of water, the percentages being based on the total weight of oil, solids and water.

The process of the invention prepares a fuel from a waste sludge that removes a maximum amount of water from the sludge with a minimum loss of oil. The two-step process requires filtering the sludge under vacuum or applied pressure with nitrogen or other inert gas and drying the sludge at a given temperature that provides a solid fuel having a high Btu.

In the present process the filtration is carried out under vacuum or at a relatively low pressure. Therefore, the filter cake obtained will contain a significant portion of the oil that was present in the sludge. By carefully drying the obtained filter cake, virtually only water will be removed from the filter cake and the less volatile oil components will remain in the dried product. It was surprisingly found that by carrying out the filtration and drying in the present invention, the process produced a non-sticking product of relatively high oil content. Due to the fact that significant oil was still present in the solid product, the heating value of this product was relatively high.

The filtration is carried out under any conventional method, provided that the applied pressure is low, at preferably no more than about 50 psi. Suitably, the filtration is carried out under vacuum or under a cap of an inert gas, such as nitrogen, at low positive pressure. The sludge is preferably filtered at an applied pressure of from about 1 to about 50 psia. In an alternate embodiment the sludge is subjected to vacuum filtration while the sludge is still at ambient pressure.

The filter cake obtained after filtration may still contain an appreciable amount of water. Since water has a negative heating value and further adds to transportation costs, if any, it is desirable to lower the water content, which also contributes to the stickiness of the dried solid product. Moreover, one of the requirements for the product to be useful as cement kiln fuel is a moisture content of less than 10% wt. Therefore, the filter cake is subjected to a drying step. Suitably the drying is carried out such that the product contains less than 10 percent by weight of water, based on the total product. The drying may be done by known methods, e.g., by heating, or by blowing heated air through the filter cake. The drying is carried out up to a temperature slightly (e.g., up to 10° C.) above the boiling point of water at the pressure under which the filter cake is dried to retain the maximum amount of oil in the solid fuels. Suitably the temperature ranges from ambient to about 200° C., preferably from about 80 to about 150° C., more preferably from about 100 to about 110° C. The product is preferably dried at about atmospheric pressure, though sub- or super-atmospheric pressures may be employed as well.

Preferably, the filtration and the drying is carried out in a single vessel. A suitable apparatus is disclosed in U.S. Pat. No. 4,622,152. This apparatus comprises a mixing and plowing means within a vessel that has one or more filter units. It is possible to provide this vessel with a steam jacket. The apparatus allows the consecutive steps of mixing, filtration and drying to take place in one single vessel. Drying aided by agitation/mixing can significantly reduce the drying time required to achieve the required dryness and non-sticking characteristics of the solids. The filtration can be carried out by applying vacuum from outside the vessel through the filter units, or by pressurizing the vessel, e.g., with nitrogen or other inert gases.

In order to facilitate the filtration, a filter aid may be added to the waste sludge prior to its subjection to the filtration. Suitable conventional filter aids include perlite, lime, diatomaceous earth, kiln dust, flyash, and cement. Most preferably, the filter aid used is diatomaceous earth.

It will be clear that when a filter aid is used that does not have a positive heating value, such as diatomaceous earth, the heating value of the filtered and dried product will inevitably be lowered. However, if the heating value is still sufficiently high, the benefits of the higher filtration rate may outweigh the disadvantage of a lower heating value.

The amount in which the filter aid is added to the waste sludge may vary within wide limits. Such amounts depend on the nature and quantity of the solids in the waste sludge, but it also depends on the desired heating value of the resulting filter cake. Suitably the amount in which the filter aid is added to the waste sludge ranges from about 5% wt to about 200% wt, based on solids in waste sludge.

As stated hereinbefore, the dried product obtained in the present invention is suitable for use as fuel, particularly as fuel in a cement kiln. In such a kiln dried and ground raw materials, such as limestone, cement rock, oyster shells, shale, clay, sand and iron ore, are fed into one end of a kiln, generally a rotary kiln, while at the other end of the kiln fuel is burned and counter-currently the raw materials are contacted with the hot combustion gases to yield cement clinker. For general information on cement, manufacture reference is made to Kirk-Othmer, *Encyclopedia of Chemical Technology*, 3rd ed., Vol. 5, Wiley, 1978, pages 180 ff.

The cement kiln is suitably operated at ambient pressure. The temperature in the cement kiln varies significantly since in the kiln, both the actual clinker burning and rapid cooling of the burnt clinker take place. The temperature of the clinker burning may be up to about 2000° C.

The advantages of employing the dried product of the present invention as fuel in a cement kiln reside in that the waste solids provide for some cement raw material in the form of metal compounds such as silica, alumina, lime and rare earth metal compounds that may be found in the waste solids. Since such compounds are incorporated in the cement clinker, there is little chance, if any, that metal compounds that may be harmful will be leached out of the cement resulting from employing such cement clinker. As indicated, due to the heating value of the oil retained in the filter cake, the dried product has a sufficiently high heating value that can be used as a low cost fuel in a cement kiln, or other combustors. In this manner both the waste disposal and the cement manufacture benefit from the present invention.

The invention is further illustrated by the following examples:

EXAMPLE 1

From a refinery waste stream containing 26% wt oil, 67% wt water, and about 7% wt of solids, one 500 ml sample was separated. The sample was filtered over a 1000 ml Buchner funnel and Whatman filter paper under vacuum until no free liquid was visible and no filtrate came through the filter. The filtration time was about 2.0 hours.

The filter cake was dried at 101° C. under $N_2$ purge for 8 hours. Subsequently the moisture content was determined, as well as the oil and grease (O&G) content and heating value. The dried filter cake (Sample A) contained 75.2% wt of oil and grease and was still non-sticking whereas conventional wisdom would expect solids with such a high oil content to be sticking. In practice, aided by agitation or filter aids, or by pressurized $N_2$, the required filtration and drying times can be significantly reduced. Since the dried filter cake has been baked above 100° C., significantly higher than the ambient temperature, the high Btu solids will not liquify during transportation.

For comparison reasons, a filter cake obtained from a similar refinery waste stream via centrifuging without any filter aid was conventionally dried at 450° F. (232° C.). The solids obtained therefrom ("Sample B") were non-sticking, too, but have far lower heating value. The same parameters as for the solids from Sample A were determined for Sample B. The results are shown in Table 1 below.

TABLE 1

|  | Laboratory Vacuum Filtration/Low Temperature Drying Sample A | Refinery Operations (Comparative) Sample B |
| --- | --- | --- |
| Moisture content, % wt | 6 | 5 |
| O&G, % wt | 75.2 | 8.2 |
| Heating value, Btu/lb | 13,900 | 4,450 |
| Solid stickiness | Non-sticking | |

From Table 1 it is apparent that this invention provides solids which meet all requirements for a suitable cement kiln fuel, whereas the conventionally obtained material fails the Btu requirements. The non-sticking characteristics and high Btu (higher than coke which typically has a heating value of 11,000 Btu/lb) content of the dried solids produced via this invention can also make it acceptable fuel for combustion facilities other than the cement kiln.

If diatomaceous earth had been added to Sample A as a filter aid in an amount of 0.2 parts by weight per part by weight of solids in the waste sludge, it was calculated that the heating value of the solid product obtained would have been 11,100 Btu/lb.

EXAMPLE 2

The achievable heating value of the final dried solid will depend on the amount of oil present in the raw sludge as shown in this example. Table 2 presents results of applying methods of this invention to different refinery waste streams (Samples C and D) with significantly lower oil content per unit mass of solids in the raw feed. Sample C is from the same refinery as Samples A and B while Sample D is from a different refinery. In all cases the dried solids produced via this invention contain a considerably higher oil content and higher heating value than those procued from refinery operations and still maintain the non-sticking characteristics required of solid fuel.

TABLE 2

|  | Refinery Operations (Comparative) | | Laboratory Vacuum Filtration/Low Temperature Drying | |
| --- | --- | --- | --- | --- |
|  | Sample C | Sample D | Sample C | Sample D |
| Raw oil sludge composition | | | | |
| Oil, % wt | 8 | 4 | 8 | 4 |
| Solids, % wt | 11 | 38 | 11 | 38 |
| Water, % wt | 81 | 58 | 81 | 58 |
| Dried solids | | | | |
| O&G, % wt | <5 | <5 | 29.51 | 15.47 |
| Btu/lb | 3,000 | 1,500 | 8,858 | 3,930 |
| Filtration pressure differential, psi | 150 | 150 | 14.7 | 14.7 |
| Drying temperature, °C. | >200 | >200 | 101 | 101 |
| Solid stickiness | Non-sticking | | | |

What is claimed is:

1. A process for the preparation of a solid fuel from a waste sludge containing solids, oil and from about 2% wt water to about 90% wt water which process comprises:
   a) filtering the sludge under vacuum or under applied pressure or inert gas up to about 50 psia while utilizing a filter aid to maximally retain of oil in the filter cake; and
   b) selectively removing moisture from the filter cake by drying at a temperature from about 100° C. to about 110° C. and at the pressure applied to the filter cake, thereby producing a high heating value, non-sticking solid fuel.

2. A process according to claim 1, in which the applied filtration pressure is varied to retain different amounts of oil and to produce different heating value desired in the final solid fuel.

3. A process according to claim 1, in which the sludge is filtered at an applied pressure of from about 1 to about 50 psia.

4. A process according to claim 1, in which the filter cake is dried at a temperature up to about 10° C. above the boiling point of water at the pressure applied to the filter cake.

5. A process according to claim 1, in which the filter cake is dried to a moisture content of less than 10 percent by weight, based on the dried product.

6. A process according to claim 1, in which the waste sludge comprises from about 5 to about 80% wt of oil, from about 2 to about 80% wt of solids and from about 2 to about 90% wt of water.

7. A process according to claim 1, in which before filtration, a filter aid is added to the waste sludge.

8. A process according to claim 7, in which the filter aid is perlite.

9. A process according to claim 7, in which the filter aid is diatomaceous earth.

10. A process according to claim 7, in which the filter aid is lime.

11. A process according to claim 7, in which the filter aid is added to the waste sludge in an amount ranging from about 10 to about 150 percent by weight based on the weight of the solids in the waste sludge.

* * * * *